United States Patent
Shao et al.

(10) Patent No.: US 12,021,596 B2
(45) Date of Patent: Jun. 25, 2024

(54) INFORMATION TRANSMISSION METHOD, NETWORK DEVICE, TERMINAL DEVICE, AND STORAGE MEDIUM

(71) Applicant: Huawei Technologies Co., Ltd., Shenzhen (CN)

(72) Inventors: Hua Shao, Shenzhen (CN); Huang Huang, Chengdu (CN); Xiaoyong Tang, Shenzhen (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 17/360,137

(22) Filed: Jun. 28, 2021

(65) Prior Publication Data

US 2021/0328652 A1 Oct. 21, 2021

Related U.S. Application Data

(63) Continuation of application No. PCT/CN2019/124859, filed on Dec. 12, 2019.

(30) Foreign Application Priority Data

Dec. 29, 2018 (CN) .......................... 201811644947.0

(51) Int. Cl.
*H04B 7/06* (2006.01)
*H04W 72/044* (2023.01)
(Continued)

(52) U.S. Cl.
CPC ...... *H04B 7/0695* (2013.01); *H04W 72/0446* (2013.01); *H04W 72/0453* (2013.01); *H04W 72/046* (2013.01); *H04W 72/23* (2023.01)

(58) Field of Classification Search
None
See application file for complete search history.

(56) References Cited

U.S. PATENT DOCUMENTS

2014/0120926 A1 5/2014 Shin et al.
2015/0358129 A1 12/2015 Ryu et al.
(Continued)

FOREIGN PATENT DOCUMENTS

CN       101674648 A    3/2010
CN       107733497 A    2/2018
(Continued)

OTHER PUBLICATIONS

"3rd Generation Partnership Project; Technical Specification Group Radio Access Network; NR; Physical layer procedures for data (Release 15)," 3GPP TS 38.214 V15.3.0, Sep. 2018, 96 pages.
(Continued)

*Primary Examiner* — Kenny S Lin
(74) *Attorney, Agent, or Firm* — Slater Matsil, LLP

(57) ABSTRACT

An information transmission method comprising configuring, by a network device, first beam sequence information, where the first beam sequence information indicates a plurality of pieces of first identification information, and where each of the plurality of pieces of first identification information indicates one beam that carries a transmission signal, sending, by the network device, the first beam sequence information to a terminal device, and performing, by the network device, signal transmission with the terminal device using the beams indicated by the plurality of pieces of first identification information.

20 Claims, 8 Drawing Sheets

(51) Int. Cl.
*H04W 72/0446* (2023.01)
*H04W 72/0453* (2023.01)
*H04W 72/23* (2023.01)

(56) References Cited

U.S. PATENT DOCUMENTS

| | | | |
|---|---|---|---|
| 2017/0303265 A1* | 10/2017 | Islam | H04W 72/23 |
| 2019/0215845 A1 | 7/2019 | Hu et al. | |
| 2019/0238210 A1 | 8/2019 | Tang et al. | |
| 2019/0268787 A1 | 8/2019 | Guan et al. | |
| 2019/0319686 A1* | 10/2019 | Chen, IV | H04W 24/08 |
| 2019/0320330 A1 | 10/2019 | Zhang et al. | |
| 2020/0059290 A1* | 2/2020 | Pan | H04W 24/10 |
| 2020/0112926 A1* | 4/2020 | Laghate | H04B 7/0404 |
| 2020/0154409 A1* | 5/2020 | Kang | H04B 7/0408 |
| 2020/0389847 A1* | 12/2020 | Deng | H04W 52/0219 |
| 2020/0404638 A1* | 12/2020 | Deogun | H04L 5/0091 |
| 2022/0263591 A1* | 8/2022 | Chen | H04L 5/0048 |

FOREIGN PATENT DOCUMENTS

| | | | |
|---|---|---|---|
| CN | 107889235 A | 4/2018 | |
| CN | 108270470 A | 7/2018 | |
| CN | 108347766 A | 7/2018 | |
| CN | 108632840 A | 10/2018 | |
| CN | 108882274 A | 11/2018 | |
| EP | 3512235 A1 | 7/2019 | |
| EP | 3537781 A1 | 9/2019 | |
| WO | 2015063592 A1 | 5/2015 | |
| WO | WO-2017197103 A1 * | 11/2017 | H04B 7/06 |
| WO | 2018094966 A1 | 5/2018 | |
| WO | 2018203815 A1 | 11/2018 | |
| WO | 2018210243 A1 | 11/2018 | |

OTHER PUBLICATIONS

3rd Generation Partnership Project; Technical Specification Group Radio Access Network; NR; Medium Access Control (MAC) protocol specification (Release 15), 3GPP TS 38.321 V15.3.0, Sep. 2018, 76 pages.

"3rd Generation Partnership Project; Technical Specification Group Radio Access Network; NR; Radio Resource Control (RRC) protocol specification (Release 15)," 3GPP TS 38.331 V15.3.0, Sep. 2018, 445 pages.

"Beam Grouping for Beam Management," Source: ZTE, ZTE Microelectronics, Agenda Item: 8.1.4.1, Document for: Discussion and Decision, 3GPP TSG RAN WG1 Meeting #86bis, R1-1610437, Lisbon, Portugal Oct. 10-14, 2016, 5 pages.

"Beam Indication for Control and Data Channels," Agenda Item: 6.1.2.2.5, Source: Huawei, HiSilicon, Document for: Discussion and decision, 3GPP TSG RAN WG1 Meeting #90, R1-1712222, 3GPP TSG RAN WG1 Meeting #90, Prague, Czech Republic, Aug. 21-25, 2017, 7 pages.

* cited by examiner

INFORMATION TRANSMISSION METHOD, NETWORK DEVICE, TERMINAL DEVICE, AND STORAGE MEDIUM

CROSS-REFERENCE TO RELATED APPLICATIONS

This application is a continuation of International Application No. PCT/CN2019/124859, filed on Dec. 12, 2019, which claims priority to Chinese Patent Application No. 201811644947.0, filed on Dec. 29, 2018. The disclosures of the aforementioned applications are hereby incorporated by reference in their entireties.

TECHNICAL FIELD

The present invention relates to the field of communications technologies, and specifically, to an information transmission method, a network device, a terminal device, and a storage medium.

BACKGROUND

A beam is a communication resource. In a wireless communications system, a prerequisite for successful communication between a terminal device (UE) and a network device is that a receive beam and a transmit beam are aligned with each other. After a beam training process and a beam management process, the network device has identified a beam set that can be used for successful communication with the terminal device. In a formal communication stage, the network device needs to indicate a beam that is in the beam set and that is used for communication to the terminal device, so that the network device and the terminal device can communicate with each other by using the beam used for communication.

A working process in which the network device indicates the beam used for communication to the terminal device is referred to as beam indication. For different types of physical channels, the network device has different beam indication manners. For example, for a physical downlink control channel (PDCCH), a beam set is first configured by using a radio resource control (RRC) layer, then a beam in the beam set is activated by a media access control-control element (MAC-CE) as a target beam, to implement PDCCH beam indication.

In a future industrial control scenario, movement of the terminal device is regular. For example, in a factory, the terminal device performs periodic or reciprocating movement on an assembly line. At the same time, communication between the terminal device and the network device is also regular. According to a beam indication manner in a conventional technology, beam indication is performed once at each location at which uplink and downlink data are sent and received, causing relatively high signaling overheads. For the foregoing scenario in which the terminal device moves regularly, signaling resources are wasted in the complex beam indication manner in the conventional technology.

Therefore, the foregoing problem in the conventional technology remains to be resolved.

SUMMARY

Embodiments of the present invention provide an information transmission method, a network device, a terminal device, and a storage medium, so that in a scenario in which the terminal device moves regularly, a beam used for communication can be sent according to a movement rule of the terminal device, thereby simplifying a beam indication manner and reducing signaling overheads.

In view of this, a first aspect of this application provides an information transmission method. The method includes a network device configures first beam sequence information, where the first beam sequence information is used to indicate a plurality of pieces of first identification information, and each of the plurality of pieces of first identification information is used to indicate one beam that carries a transmission signal, the network device sends the first beam sequence information to a terminal device, and the network device performs signal transmission with the terminal device, where the beams indicated by using the plurality of pieces of first identification information are used for the signal transmission. The network device may be a base station or a programmable logic controller (PLC), and the terminal device may be a mobile phone, or may be an executor, a sensor, or the like in an industrial environment.

In this embodiment, the network device configures the first beam sequence information, where the first beam sequence information is used to indicate the plurality of pieces of first identification information. The first beam sequence information includes one or more pieces of beam indication information, a moment and a periodicity of each beam, a port number of each beam, each piece of beam identification information, a periodicity of an entire sequence, and the like. Each of the plurality of pieces of first identification information is used to indicate one beam that carries a transmission signal, so that in a process in which the terminal device moves regularly, the network device and an electronic device perform signal transmission by using the beams indicated by using the plurality of pieces of first identification information. Therefore, when the terminal device moves regularly, a beam indication step is simplified, and signaling resources are saved.

With reference to the first aspect, in a first possible implementation, the method further includes the network device configures time sequence indication information, where the time sequence indication information is used to indicate a moment at which the network device and the terminal device perform the signal transmission by using the beams indicated by using the plurality of pieces of first identification information, and the network device sends the time sequence indication information to the terminal device. The moment indicated by using the time sequence indication information may be one or more of a slot, a symbol, a subframe, or an absolute time.

In this embodiment, the network device and the terminal device perform the signal transmission based on the indication of the first beam sequence information. A time interval of the signal transmission may be predefined by the network device, so that a time interval can be preset, where the time interval is a time interval at which the terminal device and the network device perform signal transmission in the process in which the terminal device moves regularly.

With reference to the first aspect or the first possible implementation of the first aspect, in a second possible implementation, the method further includes the network device configures periodicity information, where the periodicity information is used to indicate a periodicity in which the network device and the terminal device perform the signal transmission by using the beams indicated by using the plurality of pieces of first identification information, and the network device sends the periodicity information to the terminal device, and that the network device performs signal transmission with the terminal device includes the network device performs the signal transmission with the terminal device based on the first beam sequence information in the periodicity indicated by using the periodicity information. The periodicity indicated by using the periodicity information may be a time periodicity, and a basic time unit of the time periodicity may be one or more of a slot, a symbol, a subframe, or an absolute time.

In this embodiment, the terminal device always performs regular periodic movement in a process in which the terminal device and the network device perform the signal transmission. However, the network device does not know a periodicity of the regular movement. Therefore, the periodicity information needs to be preset in the network device, so that the network device and the terminal device can perform signal receiving and sending based on the first beam sequence information in the periodicity, to keep the signal transmission synchronized.

With reference to the second possible implementation of the first aspect, in a third possible implementation, the method further includes the network device configures second beam sequence information, where the second beam sequence information includes a plurality of pieces of second identification information, and the second identification information and the first identification information are different, and the network device sends the second beam sequence information to the terminal device, and that the network device performs signal transmission with the terminal device includes the network device performs the signal transmission with the terminal device based on the first beam sequence information and the second beam sequence information in the periodicity indicated by using the periodicity information. That the second identification information and the first identification information are different may be a part of beams indicated by using the second identification information and a part of beams indicated by using the first identification information are different, or beams indicated by using the second identification information and beams indicated by using the first identification information may be completely different. The network device may further obtain a plurality of pieces of beam sequence information, such as third beam sequence information and fourth beam sequence information, where identification information included in the plurality of pieces of beam sequence information is different, and in the periodicity indicated by using the periodicity information, the network device performs the signal transmission with the terminal device based on the plurality of pieces of beam sequence information.

In this embodiment, the network device configures two pieces of information, namely, the first beam sequence information and the second beam sequence information, and sends the two pieces of information to the terminal device, to perform the signal transmission in the periodicity by using the beams indicated by using the first beam sequence information and the second beam sequence information. When a periodicity of the regular movement of the terminal device is relatively long, a plurality of beam sequences can be run in the periodicity in this manner, to adapt to the long movement periodicity of the terminal device.

With reference to the second possible implementation of the first aspect, in a fourth possible implementation, that a network device configures first beam sequence information includes the network device configures a plurality of pieces of first beam sequence information, where the plurality of pieces of first beam sequence information are different, and the difference may be that beams indicated by using first indication information included in all the first beam sequence information are different, the method further includes the network device sends beam indication information to the terminal device, where the beam indication information is used to indicate target beam sequence information, and the target beam sequence information is one of the plurality of pieces of first beam sequence information, and that the network device performs signal transmission with the terminal device includes the network device performs the signal transmission with the terminal device based on the target beam sequence information in the periodicity indicated by using the periodicity information.

In this embodiment, in same regular periodic movement of a same terminal device, the terminal device and the network device may have different signal transmission requirements, or an originally indicated beam cannot be used to transmit a signal normally due to an environmental reason and the like. For this reason, the network device needs to configure the plurality of different pieces of first beam sequence information. The first indication information in each piece of first beam sequence information is used to indicate a different beam. Before each periodicity begins, the network device sends the beam indication information to the terminal device, to select first beam sequence information to be used in a current periodicity, so that the indicated beam can be dynamically adjusted, thereby enhancing flexibility of the signal transmission.

With reference to the first aspect and the first to the fourth possible implementations of the first aspect, in a fifth possible implementation, the method further includes the network device configures a signal type of the signal transmission, where the first beam sequence information corresponds to the signal type of the signal transmission. The signal type of the signal transmission may be a signal carried on one or more of a physical downlink control channel, a physical downlink shared channel, a physical broadcast channel, a physical uplink control channel, and a physical uplink shared channel, or one or more of an SS/PBCH block (SS/PBCH), a channel state information reference signal (CSI-RS), and a sounding reference signal (SRS).

In this embodiment, different types of transmission signals are used to implement different functions. For example, the physical downlink control channel is used to transmit signaling, the SS/PBCH block (SS/PBCH) is used to implement signal synchronization between the network device and the terminal device, and the sounding reference signal (SRS) is used to detect channel quality. Therefore, corresponding first beam sequence information needs to be configured based on the signal type, to meet transmission requirements for different signal types of the network device and the terminal device.

With reference to the first aspect, in a sixth possible implementation, a signal type of the signal transmission is physical downlink control signal, and the method further includes the network device configures resource information of the physical downlink control signal, where the resource information includes a plurality of pieces of time domain or frequency domain location information, and each of the plurality of pieces of time domain or frequency domain location information is associated with at least one piece of first identification information, and the network device sends the plurality of pieces of time domain or frequency domain location information to the terminal device, and that the network device performs signal transmission with the terminal device includes the network device sends the physical downlink control signal to the terminal device in the one or more pieces of time domain and/or frequency domain location information by using beams indicated by using the associated first identification information.

In this embodiment, the network device and the terminal device perform the signal transmission at a specific time domain or frequency domain location, so that the method in the present invention can be performed by using not only a variable of time, but also a variable of time domain or frequency domain location. Therefore, this solution can be compatible with different communication protocols.

With reference to the sixth possible implementation of the first aspect, in a seventh possible implementation, a plurality of time domain or frequency domain locations are located in a search space of the physical downlink control signal and/or a downlink control resource set.

In this embodiment, the time domain or frequency domain location is in the search space of the physical downlink control signal.

A second aspect of this application provides an information transmission method. The method includes a terminal device obtains first beam sequence information sent by a network device, where the first beam sequence information is used to indicate a plurality of pieces of first identification information, and each of the plurality of pieces of first identification information is used to indicate one beam that carries a transmission signal, and the terminal device performs signal transmission with the network device, where the beams indicated by using the plurality of pieces of first identification information are used for the signal transmission. The network device may be a base station, and the terminal device may be a mobile phone.

In this embodiment, the terminal device obtains the first beam sequence information sent by the network device, so that in a process in which the terminal device moves regularly, the terminal device can sequentially perform signal transmission with the network device based on the beams indicated by using the plurality of pieces of first identification information in the first beam sequence information, thereby simplifying a beam indication procedure, and saving signaling resources.

With reference to the second aspect, in a first possible implementation, the method further includes the terminal device obtains time sequence indication information sent by the network device, where the time sequence indication information is used to indicate a moment at which the network device and the terminal device perform the signal transmission by using the beams indicated by using the plurality of pieces of first identification information. The moment indicated by using the time sequence indication information may be one or more of a slot, a symbol, a subframe, or an absolute time.

In this embodiment, the network device and the terminal device transmit the signal based on the indication of the first beam sequence information. The signal transmission time interval may be predefined by the network device, so that it can be preset that, in a process in which the terminal device moves regularly, the terminal device learns of a time interval at which the terminal device and the network device perform signal transmission.

With reference to the second aspect or the first implementation of the second aspect, in a second implementation, the method further includes the terminal device obtains periodicity information sent by the network device, where the periodicity information is used to indicate a periodicity on which the network device and the terminal device perform the signal transmission by using the beams indicated by using the plurality of pieces of first identification information, and that the terminal device performs signal transmission with the network device includes the terminal device performs the signal transmission with the network device based on the first beam sequence information in the periodicity indicated by using the periodicity information. The periodicity indicated by using the periodicity information may be a time periodicity, and a basic time unit of the time periodicity may be one or more of a slot, a symbol, a subframe, or an absolute time.

In this embodiment, the terminal device always performs regular periodic movement in a process in which the terminal device and the network device perform signal transmission. However, the network device does not know a periodicity of the regular movement, and the terminal device does not know that the terminal device is performing regular movement. Therefore, the periodicity information preset in the network device needs to be received, so that the network device and the terminal device can perform signal receiving and sending based on the first beam sequence information in the periodicity, to keep the signal transmission synchronized.

With reference to the second possible implementation of the second aspect, in a third possible implementation, the method further includes the terminal device obtains second beam sequence information sent by the network device, where the second beam sequence information includes a plurality of pieces of second identification information, and the second identification information and the first identification information are different, and that the terminal device performs signal transmission with the network device includes the terminal device performs the signal transmission with the network device based on the first beam sequence information and the second beam sequence information in the periodicity indicated by using the periodicity information. That the second identification information and the first identification information are different may be a part of beams indicated by using the second identification information and a part of beams indicated by using the first identification information are different, or beams indicated by using the second identification information and beams indicated by using the first identification information may be completely different.

In this embodiment, the network device configures two pieces of information, the first beam sequence information and the second beam sequence information, and sends the two pieces of information to the terminal device, to perform the signal transmission in the periodicity by using the beams indicated by using the first beam sequence information and the second beam sequence information. When a periodicity of the regular movement of the terminal device is relatively long, a plurality of beam sequences are run in the periodicity in this manner, to adapt to the long movement periodicity of the terminal device.

With reference to the second possible implementation of the second aspect, in a fourth possible implementation, that a terminal device obtains first beam sequence information sent by a network device includes the terminal device obtains a plurality of pieces of first beam sequence information sent by the network device, where the plurality of pieces of first beam sequence information are different, the method further includes the terminal device obtains beam indication information sent by the network device, where the beam indication information is used to indicate target beam sequence information, and the target beam sequence information is one of the plurality of pieces of first beam sequence information, and that the terminal device performs signal transmission with the network device includes the terminal device performs the signal transmission with the network device based on the target beam sequence information in the periodicity indicated by using the periodicity information.

In this embodiment, in same regular periodic movement of a same terminal device, the terminal device and the network device may have different signal transmission requirements, or an originally indicated beam cannot be used to transmit a signal normally due to an environmental reason and the like. For this reason, the network device needs to configure the plurality of different pieces of first beam sequence information. The first indication information in each piece of first beam sequence information is used to indicate a different beam. Before each periodicity begins, the network device sends the beam indication information to the terminal device, to select first beam sequence information used in a current periodicity, so that the indicated beam can be dynamically adjusted, thereby enhancing flexibility of the signal transmission.

With reference to the second aspect and the first to the fourth possible implementations of the second aspect, in a fifth possible implementation, the first beam sequence information corresponds to the signal type of the signal transmission. The signal type of the signal transmission may be a signal carried on one or more of a physical downlink control channel, a physical downlink shared channel, a physical broadcast channel, a physical uplink control channel, and a physical uplink shared channel, or one or more of an SS/PBCH block (SS/PBCH), a channel state information reference signal (CSI-RS), and a sounding reference signal (SRS).

In this embodiment, different types of transmission signals are used to implement different functions. For example, the physical downlink control channel is used to transmit signaling, the SS/PBCH block (SS/PBCH) is used to implement signal synchronization between the network device and the terminal device, and the sounding reference signal (SRS) is used to detect channel quality. Therefore, corresponding first beam sequence information needs to be configured based on the signal type, to meet transmission requirements for different signal types of the network device and the terminal device.

With reference to the second aspect, in a sixth possible implementation, a signal type of the signal transmission is physical downlink control signal, and the method further includes the terminal device obtains a plurality of pieces of time domain or frequency domain location information sent by the network device, where each of the plurality of pieces of time domain or frequency domain location information is associated with at least one piece of first identification information, and that the terminal device performs signal transmission with the network device includes the terminal device receives the physical downlink control signal sent by the network device in the one or more pieces of time domain and/or frequency domain location information by using beams indicated by using the associated first identification information.

In this embodiment, the network device and the terminal device perform signal transmission at a specific time domain or frequency domain location, so that the method in the present invention can be performed by using not only a variable of time, but also a variable of time domain or frequency domain location. Therefore, this solution can be compatible with different communication protocols.

With reference to the sixth possible implementation of the second aspect, in a seventh possible implementation, a plurality of time domain or frequency domain locations are located in a search space of the physical downlink control signal.

A third aspect of this application provides a network device. The network device includes a transceiver, a processor, and a memory. The processor is adapted to control the transceiver to send and receive a signal, the memory is adapted to store a computer program, and the processor is adapted to invoke and run the computer program stored in the memory, so that the network device performs the information transmission method according to any one of the first aspect or the possible implementations of the first aspect.

A fourth aspect of this application provides a chip. The chip includes a processor. The processor is adapted to read and execute a computer program stored in a memory, to perform the method in any one of the possible implementations of the first aspect. Optionally, the chip further includes the memory, and the memory and the processor are connected to another memory through a circuit or a wire. Further, optionally, the chip further includes a communications interface. The processor is connected to the communications interface. The communications interface is adapted to receive data and/or information that needs to be processed. The processor obtains the data and/or the information from the communications interface, processes the data and/or the information, and outputs a processing result by using the communications interface. The communications interface may be an input/output interface. Optionally, the memory and the processor may be physically independent units, or the memory and the processor may be integrated together.

A fifth aspect of this application provides a computer program product. The computer program product includes computer program code. When the computer program code is run on a computer, the computer is enabled to perform the method according to any one of the possible implementations of the first aspect.

A sixth aspect of this application provides a communications apparatus. The communications apparatus has a function of implementing the network device in any one of the possible implementations of the first aspect. The functions may be implemented by hardware, or may be implemented by hardware executing corresponding software. The hardware or the software includes one or more units corresponding to the functions.

A seventh aspect of this application provides a terminal device. The terminal device includes a transceiver, a processor, and a memory. The processor is adapted to control the transceiver to send and receive a signal, the memory is adapted to store a computer program, and the processor is adapted to invoke and run the computer program stored in the memory, so that the terminal device performs the information transmission method according to any one of the second aspect or the possible implementations of the second aspect.

An eighth aspect of this application provides a chip. The chip includes a processor. The processor is adapted to read and execute a computer program stored in a memory, to perform the method in any one of the possible implementations of the second aspect. Optionally, the chip further includes the memory, and the memory and the processor are connected to another memory through a circuit or a wire. Further, optionally, the chip further includes a communications interface. The processor is connected to the communications interface. The communications interface is adapted to receive data and/or information that needs to be processed. The processor obtains the data and/or the information from the communications interface, processes the data and/or the information, and outputs a processing result by using the communications interface. The communications interface may be an input/output interface. Optionally, the memory and the processor may be physically independent units, or the memory and the processor may be integrated together.

A ninth aspect of this application provides a computer program product. The computer program product includes computer program code. When the computer program code is run on a computer, the computer is enabled to perform the method according to any one of the possible implementations of the second aspect.

A tenth aspect of this application provides a communications apparatus. The communications apparatus has a function of implementing the terminal device in any one of the possible implementations of the second aspect. The functions may be implemented by hardware, or may be implemented by hardware executing corresponding software. The hardware or the software includes one or more units corresponding to the functions.

An eleventh aspect of this application provides an information transmission system. The system includes a network device and a terminal device. The network device is adapted to perform the information transmission method according to any one of the first aspect or the possible implementations of the first aspect. The terminal device is adapted to perform the information transmission method according to any one of the second aspect or the possible implementations of the second aspect.

A twelfth aspect of this application provides an information transmission system. The system includes the network device in any of the possible implementations mentioned above or a network device including the chip in any of the possible implementations mentioned above, and the terminal device in any of the possible implementations mentioned above, or a terminal device including the chip in any of the possible implementations mentioned above.

It can be learned from the foregoing technical solutions that the embodiments of this application have the following advantages.

According to the embodiments of the present invention, an information transmission method, a network device, a terminal device, and a storage medium are provided. The method includes a network device configures first beam sequence information, where the first beam sequence information is used to indicate a plurality of pieces of first identification information, and each piece of first identification information is used to indicate one beam that carries a transmission signal, the network device sends the first beam sequence information to a terminal device, and the network device performs signal transmission with the terminal device, where the beams indicated by using the plurality of pieces of first identification information are used for the signal transmission. In a scenario in which the terminal device moves regularly, a movement rule of the terminal device is fixed, for example, the terminal device periodically moves at a specific moment, a specific time domain location, or a specific frequency domain location. In this case, the first beam sequence information is configured for a specific movement rule. Therefore, the network device and the terminal device can learn of, based on the first beam sequence information, a beam that is to be used for each time of communication in a periodicity, thereby skipping a step of beam indication, and reducing signaling overheads.

DETAILED DESCRIPTION OF ILLUSTRATIVE EMBODIMENTS

Figure 1:
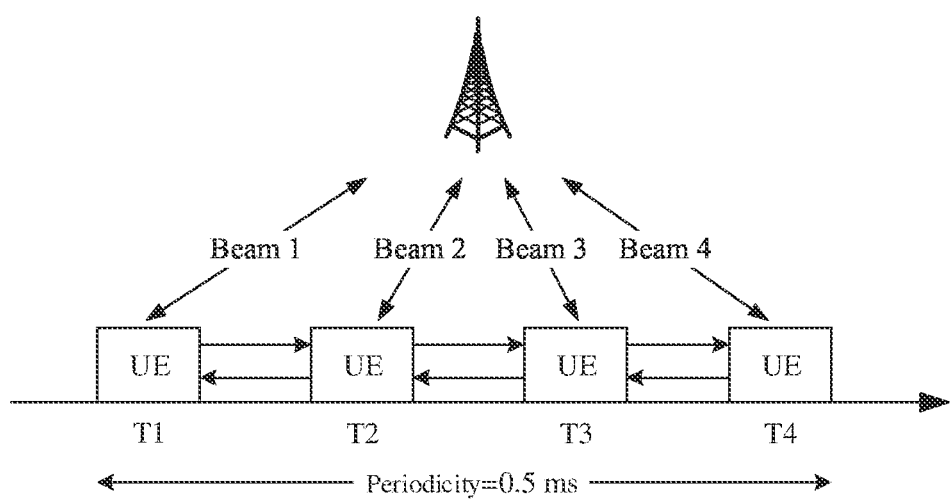
FIG. 1 is a schematic diagram of an application scenario according to an embodiment of this application.

Embodiments of the present invention provide an information transmission method, a network device, a terminal device, and a storage medium, so that beam sequence information can be preconfigured on a network device side and sent to the terminal device, thereby avoiding that beam indication is performed each time the network device and the terminal device communicate with each other, and saving signaling resources.

To make a person skilled in the art understand the technical solutions in this application better, the following clearly describes the technical solutions in the embodiments of this application with reference to the accompanying drawings in the embodiments of this application. It is clear that, the described embodiments are merely a part rather than all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

In the embodiments of this application, the network device is an apparatus that is deployed in a radio access network to provide a wireless communication function for the terminal device. The network device may include various forms of macro base stations, micro base stations (also referred to as small cells), relay stations, access points, and the like. In systems in which different radio access technologies are used, a device having a base station function may be termed differently. For example, the device is referred to as an evolved NodeB (eNB or eNodeB) in an LTE system, a NodeB in a 3rd generation (3G) system, or a wireless network access device in a 5th generation (5G) system. For ease of description, in all the embodiments of this application, all the foregoing apparatuses that provide a wireless communication function for the terminal are referred to as a network device or a base station or a BS.

The terminal device in the embodiments of this application may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or the like.

A main problem of high-frequency communication is that energy of a signal sharply decreases as a transmission distance increases, resulting in a short transmission distance of the signal. To resolve this problem, an analog beam technology is used in the high-frequency communication, and a large-scale antenna array is used for weighting processing, so that signal energy is concentrated in a relatively small range, to form a signal (which is referred to as an analog beam, a beam for short) similar to an optical beam, thereby extending the transmission distance.

The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams with a same communication feature or similar communication features may be considered as one beam. One beam may be formed by one or more antenna ports, and is used to transmit a data channel, a control channel, a sounding signal, and the like. The one or more antenna ports for forming one beam may also be considered as one antenna port set.

Beams may include a transmit beam and a receive beam. A transmit beam may be distribution of signal strength formed in different directions in space after a signal is transmitted by using an antenna, and a receive beam may be distribution in which an antenna array enhances or weakens reception of a wireless signal in different directions in space.

A beam may be represented by using a quasi-colocation (QCL) relationship between antenna ports. Specifically, signals of two identical beams have a QCL relationship about a spatial receive parameter (spatial Rx parameter), namely, QCL-Type D: {Spatial Rx parameter} in a protocol. In the protocol, the beam may be specifically represented by using identifiers of various signals, for example, a resource index of a channel state information reference signal (CSI-RS), an index of a synchronization signal and physical broadcast channel block (SS/PBCH block or SSB), a resource index of a sounding reference signal (SRS), and a resource index of a tracking reference signal (TRS).

In addition, generally, one beam corresponds to one DMRS port, one transmission configuration index (TCI), one transmit and receive point (TRP), or one sounding reference signal resource indicator (SRS resource indicator, SRI) (used for uplink data transmission). Therefore, different beams may also be represented by using different DMRS ports, TCIs, TRPs, or SRIs.

For ease of description, in this application, the beam, the transmit and receive point (TRP), the sounding reference signal resource indicator (SRS), the resource index of the channel state information reference signal (CSI-RS), the index of the synchronization signal and physical broadcast channel block (SSB), the resource index of the sounding reference signal (SRS), the resource index of the tracking reference signal (TRS), or the like may be replaced with each other, and the replacement does not change essence of the method provided in the embodiments of this application.

In a wireless communications system, a prerequisite for successful communication between the terminal device and the network device is that a receive beam and a transmit beam are aligned with each other. After a beam training process and a beam management process, the network device has identified a beam set that can be used for successful communication with the terminal device. In a formal communication stage, the network device needs to indicate a beam that is in the beam set and that is used for communication to the terminal device, so that the network device and the terminal device can communicate with each other by using the beam used for communication, that is, perform beam indication.

Referring to FIG. 1, in a future industrial control scenario, movement of a terminal device (UE) is regular. As shown in FIG. 1, the terminal device (UE) performs regular reciprocating movement in a periodicity of 0.5 ms, and performs signal transmission with a network device at four moments T1 to T4. In other words, the terminal device performs signal transmission with the network device at a same location at a corresponding moment in each periodicity. In a current beam indication manner, beam indication is performed once at each location at which uplink and downlink data is sent and received, and signaling overheads are wasted.

Figure 2:
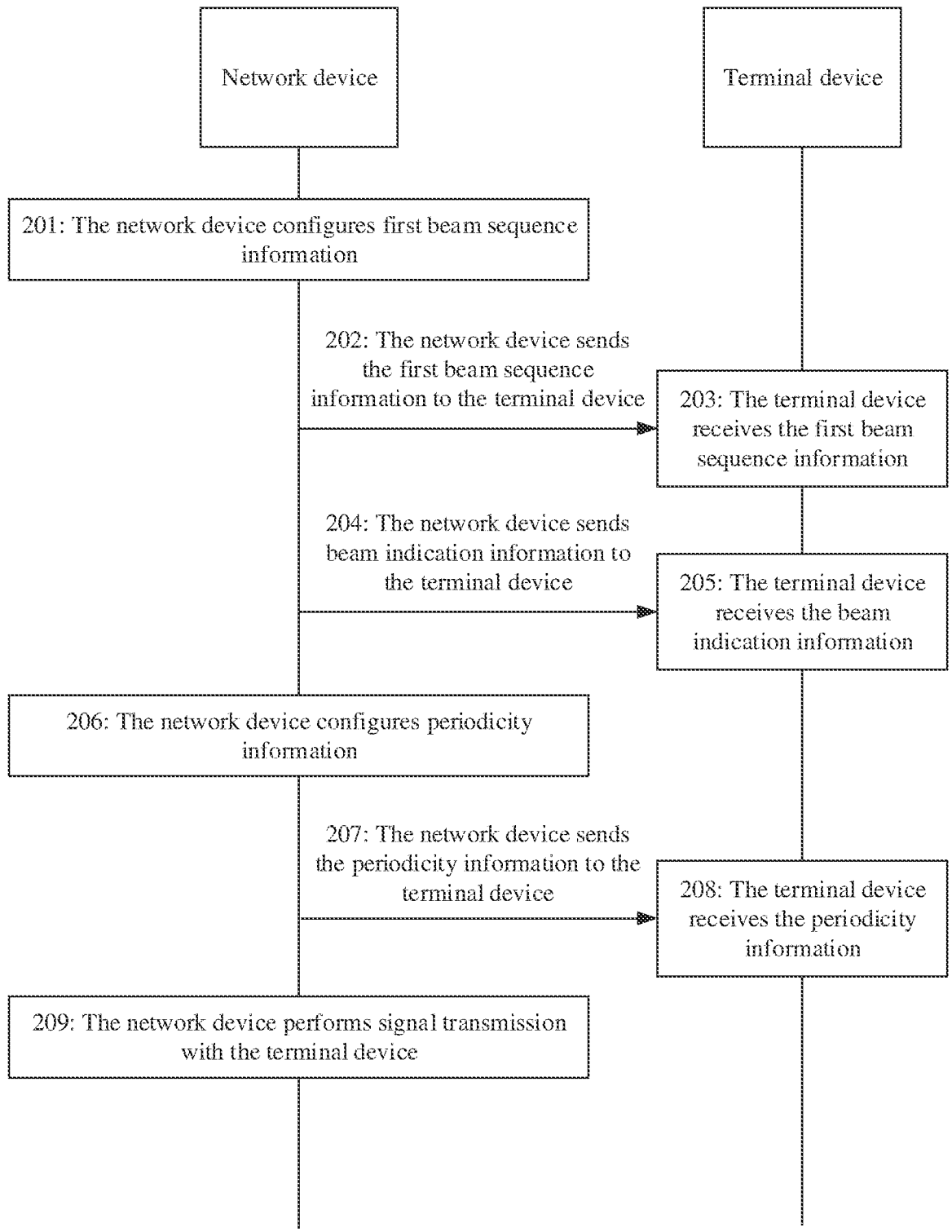
FIG. 2 is a schematic diagram of a first embodiment of an information transmission method according to embodiments of this application.

To resolve the foregoing problem, this application provides an information transmission method. A network device can preconfigure beam sequence information and send the beam sequence information to a terminal device, so that both the network device and the terminal device learn of a moment and a beam for signal transmission in a periodicity in which the terminal device moves regularly. For ease of understanding, the following describes a specific procedure of this case. Referring to FIG. 2, a first embodiment of the information transmission method according to the embodiments of this application includes the following steps.

First, the network device configures an available beam for performing signal transmission with the terminal device. The step may be as follows.

201: The network device configures first beam sequence information.

In this embodiment, the network device may obtain one piece of first beam sequence information, or may obtain a plurality of pieces of first beam sequence information. Each piece of first beam sequence information is used to indicate a plurality of pieces of first identification information, and each of the plurality of pieces of first identification information is used to indicate one beam that carries a transmission signal. When the network device configures a plurality of pieces of first beam sequence information, each piece of first beam sequence information corresponds to a different beam.

Further, when the network device configures the plurality of pieces of first beam sequence information, the network device may construct corresponding first beam sequence information based on a signal type of the signal transmission. The signal type may be a signal carried on one or more of a physical downlink control channel, a physical downlink shared channel, a physical broadcast channel, a physical uplink control channel, and a physical uplink shared channel, or one or more of an SS/PBCH block (SS/PBCH), a channel state information reference signal (CSI-RS), and a sounding reference signal (SRS). The physical downlink control channel is used to transmit information such as a transmission format, resource allocation, an uplink scheduling grant, power control, and uplink retransmission. The SS/PBCH block (SS/PBCH) is used to implement synchronization between the network device and the terminal device, and the synchronization may be time synchronization, frequency synchronization, or time-frequency synchronization. The channel state information reference signal (CSI-RS) and the sounding reference signal (SRS) are used to detect channel quality. A specific working manner of the signal type is a well-known technology in the art, and details are not described herein.

202: The network device sends the first beam sequence information to the terminal device.

In this embodiment, if the network device obtains only one piece of first beam sequence information, the network device sends the first beam sequence information, if the network device configures the plurality of pieces of first beam sequence information, the network device sends all the first beam sequence information. It should be noted that sending moment of the plurality of pieces of first beam sequence information may be different. That is, all the first beam sequence information may be simultaneously sent, or may be separately sent. This is not limited in this application.

203: The terminal device receives the first beam sequence information.

If the network device sends the plurality of pieces of first beam sequence information, this embodiment may further include the following step 204 and/or step 205.

204: The network device sends beam indication information to the terminal device.

In this embodiment, the beam indication information is used to indicate one of the plurality of pieces of first beam sequence information as target beam sequence information, and signal transmission is performed in subsequent steps based on an indication of the target beam sequence information, so that signal transmission can be performed between the network device and the terminal device based on different beam sequence information. In a process in which the network device performs signal transmission with the terminal device, if the network device determines, by using a reference signal or a signal quality feedback, that communication quality of a current beam is lower than a threshold, the network device sends new beam indication information to the terminal device, to switch to a new target beam sequence, and indicate a new beam to perform communication in a subsequent periodicity, thereby ensuring stability of the signal transmission between the network device and the terminal device. Alternatively, in a process in which the network device performs signal transmission with the terminal device, if the terminal device determines, by using a reference signal, that communication quality of a current beam is lower than a threshold, the terminal device requests a new beam or beam sequence, or the terminal device actively switches to a candidate beam configured by the network device, to ensure stability of the signal transmission between the network device and the terminal device.

During specific working, the network device configures the plurality of pieces of first beam sequence information by using radio resource control (RRC), and then triggers the beam indication information by using a media access control element (MAC-CE) or downlink control information (DCI).

205: The terminal device receives the beam indication information.

In this embodiment, the terminal device receives the beam indication information, to learn of first beam sequence information that should be used as the target beam sequence information in the plurality of pieces of received first beam sequence information.

Further, the method may further include the following step 206.

206: The network device configures periodicity information.

In this embodiment, the periodicity information is used to indicate a periodicity in which the network device and the terminal device perform the signal transmission by using the beams indicated by using the plurality of pieces of first identification information, and the terminal device repeats the periodicity to implement regular movement.

207: The network device sends the periodicity information to the terminal device.

In this embodiment, the network device sends the periodicity information to the terminal device, so that the terminal device learns of a periodicity in which the terminal device should perform signal transmission with the network device.

208: The terminal device receives the periodicity information.

In this embodiment, the terminal device receives the periodicity information, so that the terminal device learns of the periodicity in which the terminal device should perform signal transmission with the network device.

209: The network device performs signal transmission with the terminal device.

In this embodiment, based on different information sent by the network device, there may be the following working manners.

1. There is only one piece of first beam sequence information: If the network device sends only one piece of first beam sequence information, the network device and the terminal device may perform signal transmission, according to a protocol specification, by sequentially using a beam indicated by each piece of first identification information indicated in the first beam sequence information. If the network device further sends periodicity information, the network device and the terminal device perform signal transmission based on the indication of the first beam sequence information in a periodicity indicated by using the periodicity information.
2. There are a plurality of pieces of first beam sequence information: If the network device sends a plurality of pieces of first beam sequence information, and the network device sends the beam indication information, the network device and the terminal device perform signal transmission based on target beam sequence information indicated by using the beam indication information. If the network device further sends periodicity information, the network device and the terminal device perform signal transmission based on the indication of the target beam sequence information in a periodicity indicated by using the periodicity information.

3. There are a plurality of pieces of first beam sequence information, but the network device does not send beam indication information for indication the network device and the terminal device perform, in a periodicity indicated by using periodicity information, signal receiving and sending based on each piece of first beam sequence information sent by the network device.

It should be noted that, in the foregoing embodiment, an interval at which signals are transmitted based on beams indicated by using the plurality of pieces of first identification information is set by default according to a protocol. The network device and the terminal device perform signal transmission in a preset case according to a protocol specification, and a user does not participate in setting. During specific use, the user may further need to autonomously set a condition for triggering signal transmission between the network device and the terminal device. For this purpose, the present invention provides two embodiments, which are respectively as follows. The network device and the terminal device perform signal transmission at a moment that is set by the user, and the network device and the terminal device perform signal transmission at a time domain or frequency domain location that is set by the user. The following separately describes the two cases.

I. The network device and the terminal device perform signal transmission at a moment that is set by the user.

Figure 3A:
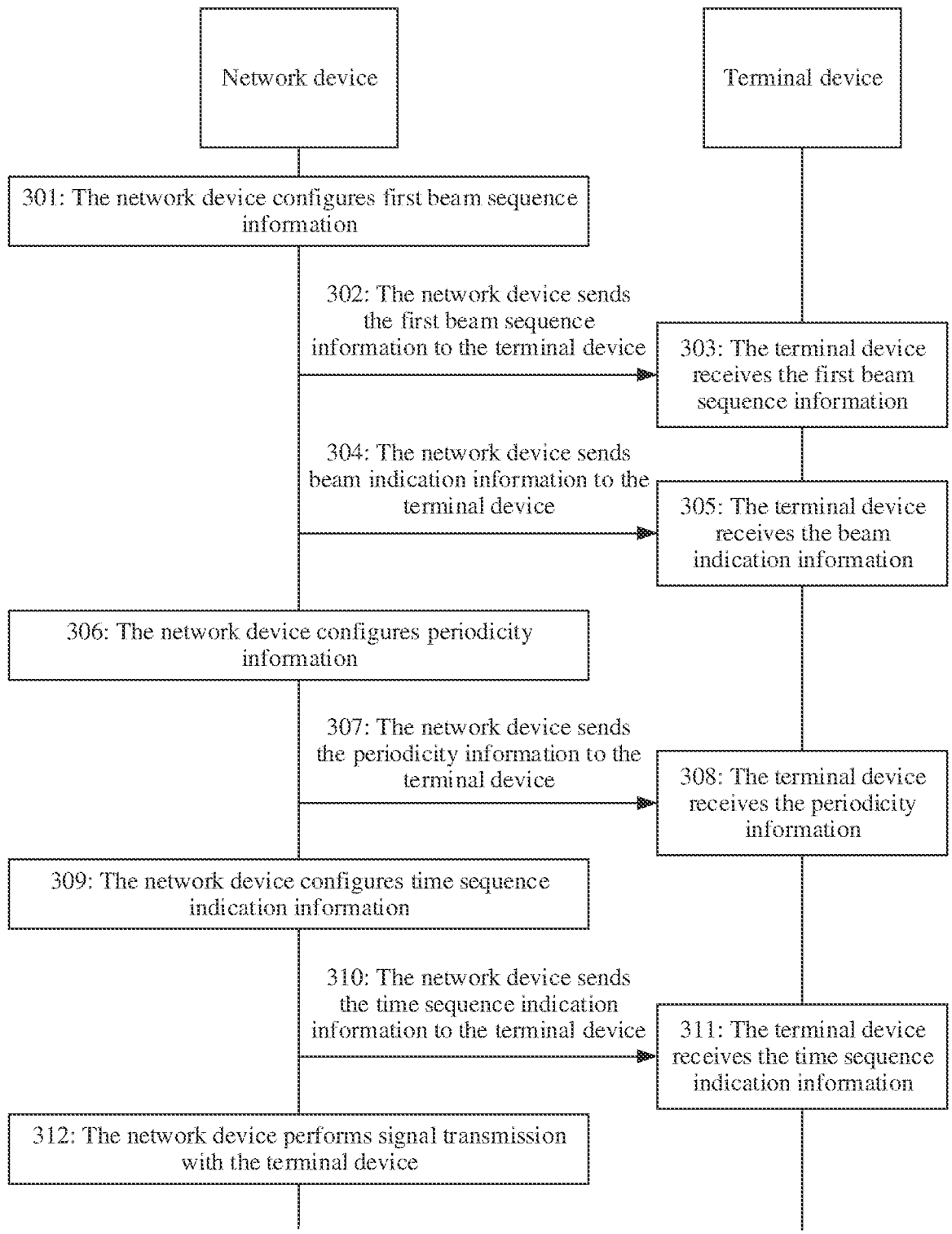
FIG. 3a is a schematic diagram of a second embodiment of an information transmission method according to embodiments of this application.

In a second embodiment provided in the present invention, the network device configures time sequence indication information, where the time sequence indication information is used to indicate a moment at which the network device and the terminal device perform signal transmission, so that the signal transmission is performed based on the moment indicated by using the time sequence indication information. For ease of understanding, the following describes a specific procedure of this case. Referring to FIG. 3a, the second embodiment of the information transmission method according to the embodiments of this application includes the following steps.

For steps 301 to 308, refer to steps 201 to 208. Details are not described herein again.

309: The network device configures time sequence indication information.

In this embodiment, the time sequence indication information is used to indicate a moment at which the network device and the terminal device perform signal transmission. The moment is one or more of a slot, a symbol, a subframe, or an absolute time. The time sequence indication information includes a plurality of moments, where the moments are customized by a user based on a requirement, and the network device and the terminal device perform signal transmission at each of the plurality of moments.

310: The network device sends the time sequence indication information to the terminal device.

In this embodiment, the network device sends the time sequence indication information to the terminal device, so that the network device and the terminal device both learn of the moment to perform signal transmission by using the beams indicated by using the plurality of pieces of first identification information.

311: The terminal device receives the time sequence indication information.

In this embodiment, the terminal device receives the time sequence indication information, so that the terminal device learns of the moment to perform signal transmission with the network device by using the beams indicated by using the plurality of pieces of first identification information.

312: The network device performs signal transmission with the terminal device.

In this embodiment, the network device performs signal transmission with the terminal device at the moment indicated by using the time sequence indication information. When the network device sends the periodicity information, there are the following several implementations.

Figure 3B:
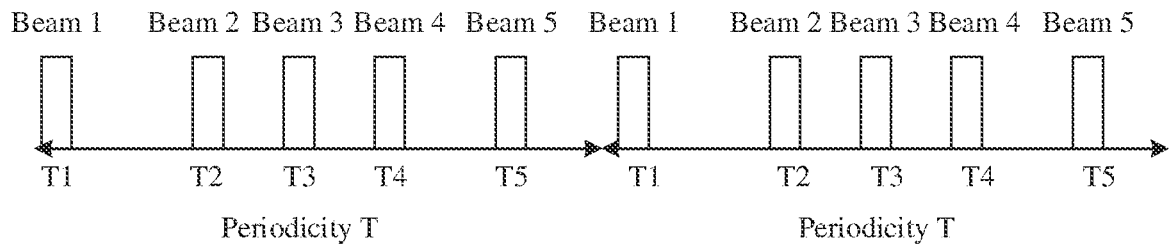
FIG. 3b is a schematic diagram of a first example of a second embodiment of an information transmission method according to embodiments of this application.

1. Referring to FIG. 3b, the network device obtains only one piece of beam sequence information. In this case, in the periodicity indicated by using the periodicity information, the network device and the terminal device perform signal transmission based on the indication of the beam sequence information at a moment indicated by using the time sequence indication information. For example, as shown in FIG. 3b, signal receiving and sending are performed based on the beam sequence information in a periodicity T. There are five pieces of first indication information in the beam sequence information, and the five pieces of first indication information respectively indicate five beams 1 to 5. The time sequence indication information indicates five moments T1 to T5. Therefore, in a periodicity, the network device and the terminal device perform signal transmission at the moment T1 by using the beam 1, perform signal transmission at the moment T2 by using the beam 2, . . . , and perform signal transmission at the moment T5 by using the beam 5. The network device and the terminal device repeat steps in the periodicity T with regular movement of the terminal device.

Figure 3C:
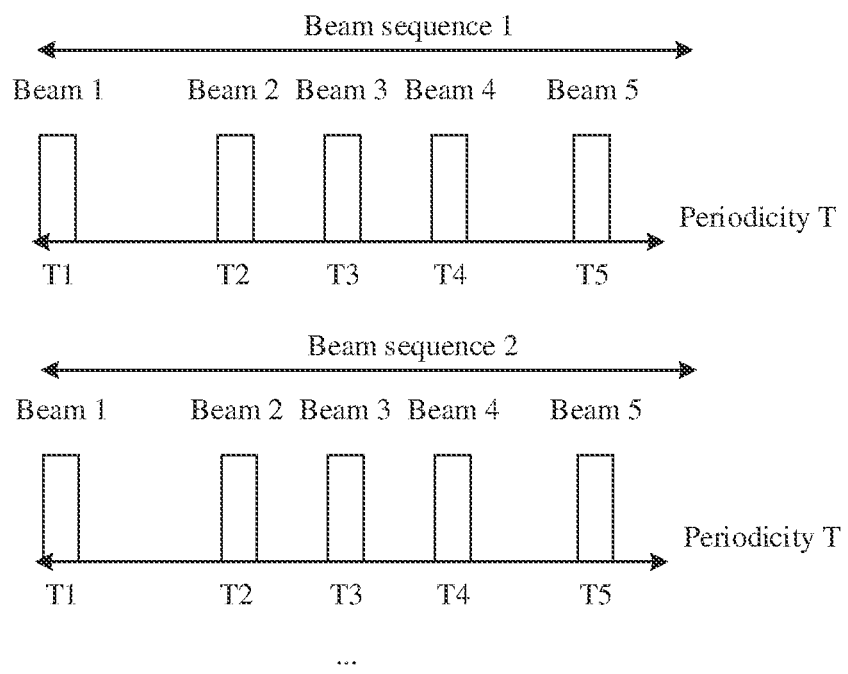
FIG. 3c is a schematic diagram of a second example of a second embodiment of an information transmission method according to embodiments of this application.

2. Referring to FIG. 3c, the network device configures a plurality of pieces of beam sequence information, and sends the beam indication information to the terminal device. In this case, the network device and the terminal device perform, in the periodicity indicated by using the periodicity information, signal transmission by using the target beam sequence indicated by using the beam indication information and at a moment indicated by using the time sequence indication information. For example, as shown in FIG. 3c, the network device configures and sends, to the terminal device, two pieces of beam sequence information, which are denoted as a beam sequence 1 and a beam sequence 2 respectively. The beam sequence 1 and the beam sequence 2 each indicate five beams 1 to 5, and the beams 1 to 5 indicated by using the beam sequence 1 and the beams 1 to 5 indicated by using the beam sequence 2 are completely different or partially different. The time sequence indication information indicates five moments T1 to T5. The beam indication information indicates that the beam sequence 1 is the target beam sequence information. In this case, the network device and the terminal device perform signal transmission at the moment T1 in the periodicity by using the beam 1 in the beam sequence 1, perform signal transmission at the moment T2 by using the beam 2 in the beam sequence 1, and so on, until five times of signal transmission are performed at the five moments in the current periodicity. In a new periodicity, the network device sends new beam indication information to indicate that the beam sequence 2 is the target beam sequence information. In this case, the beam sequence 2 is used to perform the foregoing working process. In addition, the network device may further obtain new time sequence indication information between periodicities. Moments indicated by using the new time sequence indication information are different from moments indicated by using the old time sequence indication information, to adjust moments of signal transmission.

Figure 3D:
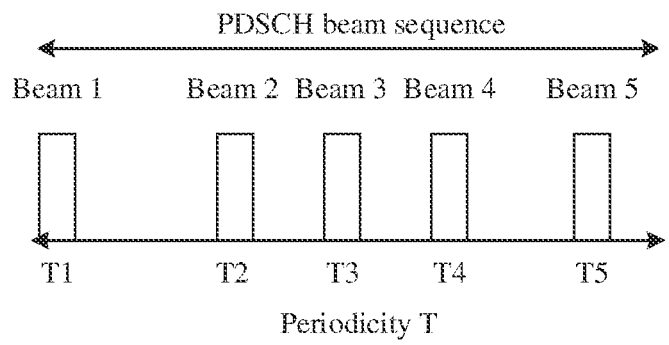
FIG. 3d is a schematic diagram of a third example of a second embodiment of an information transmission method according to embodiments of this application.

3. Referring to FIG. 3d, when obtaining a plurality of pieces of beam sequence information, the network device obtains corresponding beam sequence information for each type of transmission signal based on a type corresponding to the transmission signal. As shown in FIG. 3d, the beam indication information indicates that a beam sequence corresponding to a physical downlink shared channel (PDSCH) is used as the target beam sequence information. Other working manners are the same as the foregoing manner, and details are not described herein again.

Figure 3E:
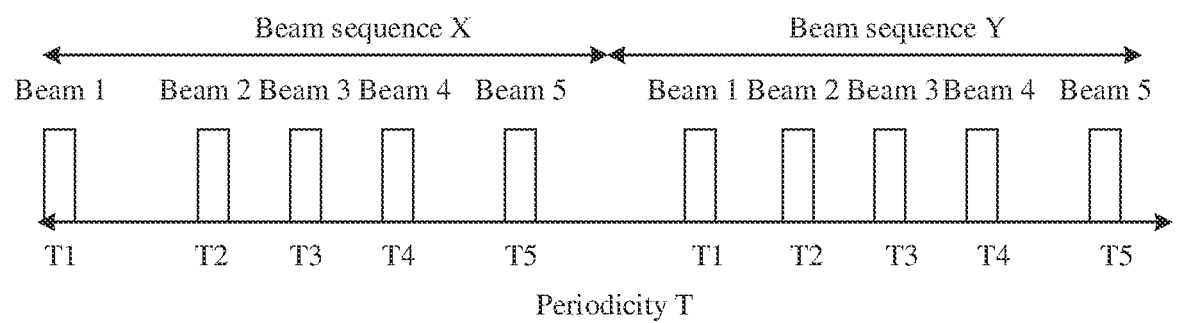
FIG. 3e is a schematic diagram of a fourth example of a second embodiment of an information transmission method according to embodiments of this application.

4. Referring to FIG. 3e, the network device configures a plurality of pieces of beam sequence information, but does not send the beam indication information to the terminal device. In this case, the network device and the terminal device perform, in the periodicity indicated by using the periodicity information, signal receiving and sending based on each piece of beam information sent by the network device. For example, as shown in FIG. 3e, the network device simultaneously obtains and sends, to the terminal device, first beam sequence information (a beam sequence X) and second beam sequence information (a beam sequence Y). The beam sequence X indicates five beams, namely, a beam 1 to a beam 5, the beam sequence Y indicates five beams, namely, a beam 1 to a beam 5, and moments corresponding to the five beams indicated by using the beam sequence X are different from moments corresponding to the five beams indicated by using the beam sequence Y. The time sequence indication information indicates moments T1 to T5. In this case, in a periodicity T, the beam sequence X is first executed, and then the beam sequence Y is executed. A specific execution manner is the same as the foregoing manner, and details are not described herein again. The foregoing manner is merely an example. During actual working, signal receiving and sending may further be performed based on the plurality of pieces of beam sequence information in one periodicity, to adapt to long-periodicity regular movement of the terminal device.

II. The network device and the terminal device perform signal transmission at a time domain or frequency domain location that is set by the user.

Figure 4A:
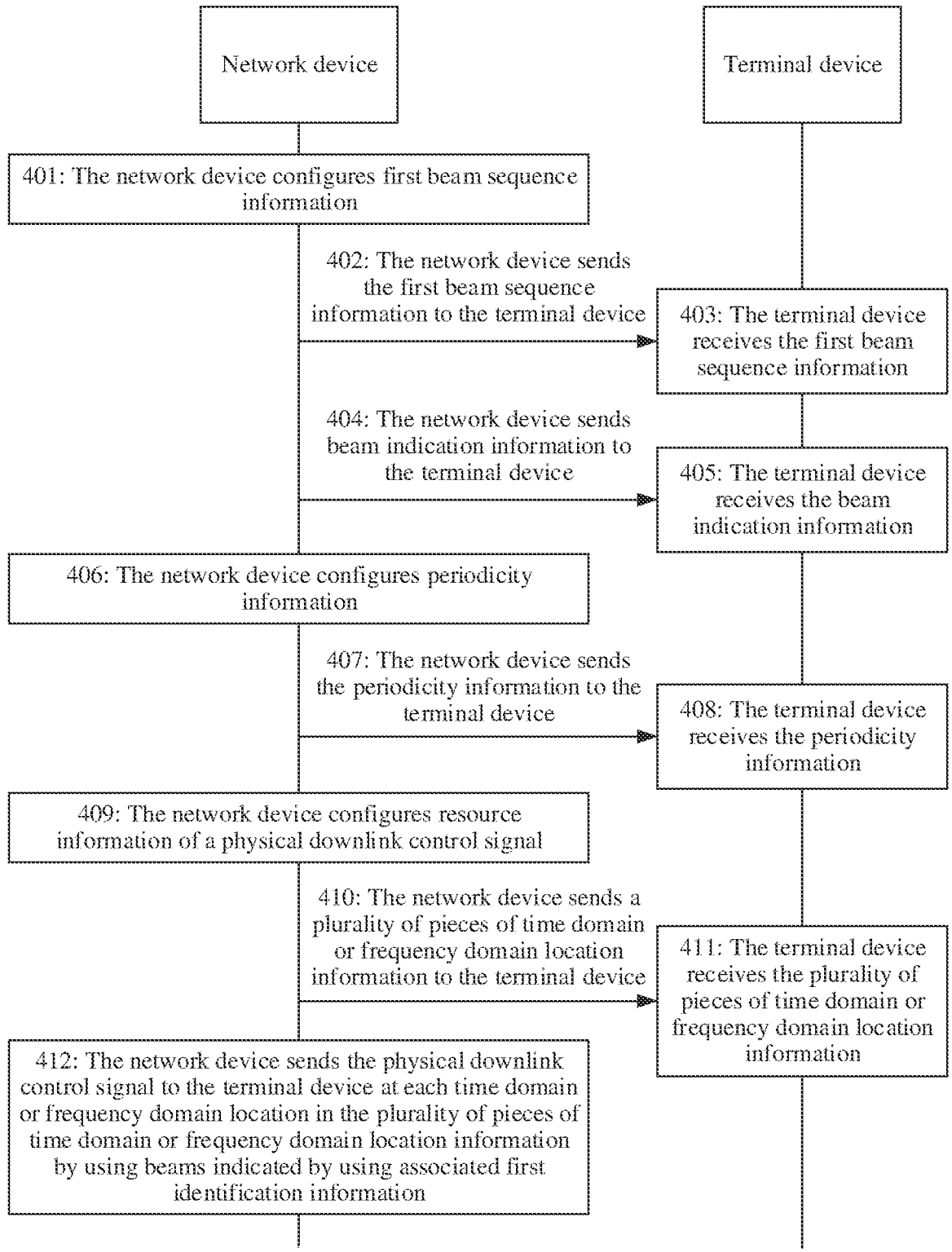
FIG. 4a is a schematic diagram of a third embodiment of an information transmission method according to embodiments of this application.

In a 5G-related protocol, concepts of time domain and frequency domain are introduced. There is not only a variable of one dimension that is time, but when the signal type is a physical downlink control signal, frequency change is also introduced as another variable. In this case, the present invention provides a signal transmission solution based on the time domain or frequency domain location. For ease of understanding, the following describes a specific procedure of this case. Referring to FIG. 4a, a third embodiment of the information transmission method according to the embodiments of this application includes the following steps.

For steps 401 to 408, refer to steps 201 to 208. Details are not described herein again.

409: The network device configures resource information of the physical downlink control signal.

In this embodiment, the resource information includes a plurality of pieces of time domain or frequency domain location information, where each of the plurality of pieces of time domain or frequency domain location information is associated with at least one piece of first identification information.

410: The network device sends the plurality of pieces of time domain or frequency domain location information to the terminal device.

In this embodiment, signal receiving and sending are performed based on a plurality of time domain or frequency domain locations included in the plurality of pieces of time domain or frequency domain location information in one periodicity. The network device sends the plurality of pieces of time domain or frequency domain location information to the terminal device, so that the network device and the terminal device both learn of a time domain or frequency domain location of signal transmission.

411: The terminal device receives the plurality of pieces of time domain or frequency domain location information.

In this embodiment, the terminal device receives the time domain or frequency domain location information, so that the terminal device learns of the time domain or frequency domain location at which the terminal device should perform signal transmission with the network device.

412: The network device sends the physical downlink control signal to the terminal device at each time domain or frequency domain location in the plurality of pieces of time domain or frequency domain location information by using beams indicated by using the associated first identification information.

Figure 4B:
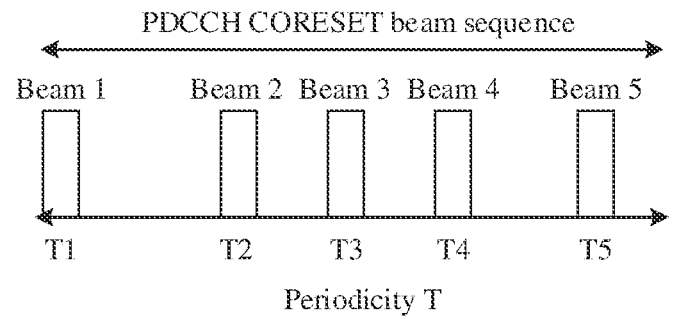
FIG. 4b is a schematic diagram of a first example of a third embodiment of an information transmission method according to embodiments of this application.

In this embodiment, referring to FIG. 4b, in a periodicity T, the network device configures and sends, to the terminal device, five time domain or frequency domain locations T1 to T5. Each of the five time domain or frequency domain locations corresponds to a beam indicated by using the first identification information in the first beam sequence information. Specifically, the first beam sequence information in this embodiment is a physical downlink control channel control resource set (PDCCH CORESET) beam sequence. The PDCCH CORESET beam sequence indicates five beams, namely, a beam 1 to a beam 5, where the beam 1 corresponds to T1, the beam 2 corresponds to T2, . . . , and the beam 5 corresponds to T5. In a process of regular movement, the terminal device performs communication with the network device at each of the foregoing time domain or frequency domain locations by using the corresponding beam.

It should be noted that the time domain or frequency domain location may alternatively be a time domain or frequency domain location in a search space.

In this embodiment, based on different quantities of first beam sequences configured by the network device and sent to the terminal device, any solution in the second embodiment of this application may be performed during signal transmission. Details are not described herein again.

In the second embodiment and the third embodiment, the signal transmission method in the first embodiment is performed by using the moment and the time domain or frequency domain location as variables respectively, so that signal exchange can be performed between the network device and the terminal device based on the beam sequence information configured by the network device, thereby simplifying a beam indication procedure, and reducing signaling overheads. It may be understood that to implement the foregoing functions, the network device and the terminal device include corresponding hardware structures and/or software modules for implementing the functions. A person skilled in the art should easily be aware that, in combination with modules and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In terms of a hardware structure, the information transmission method may be implemented by a physical device, or may be jointly implemented by a plurality of physical devices, or may alternatively be implemented by a logical function module inside a physical device. This is not specifically limited in the embodiments of this application.

Figure 5:
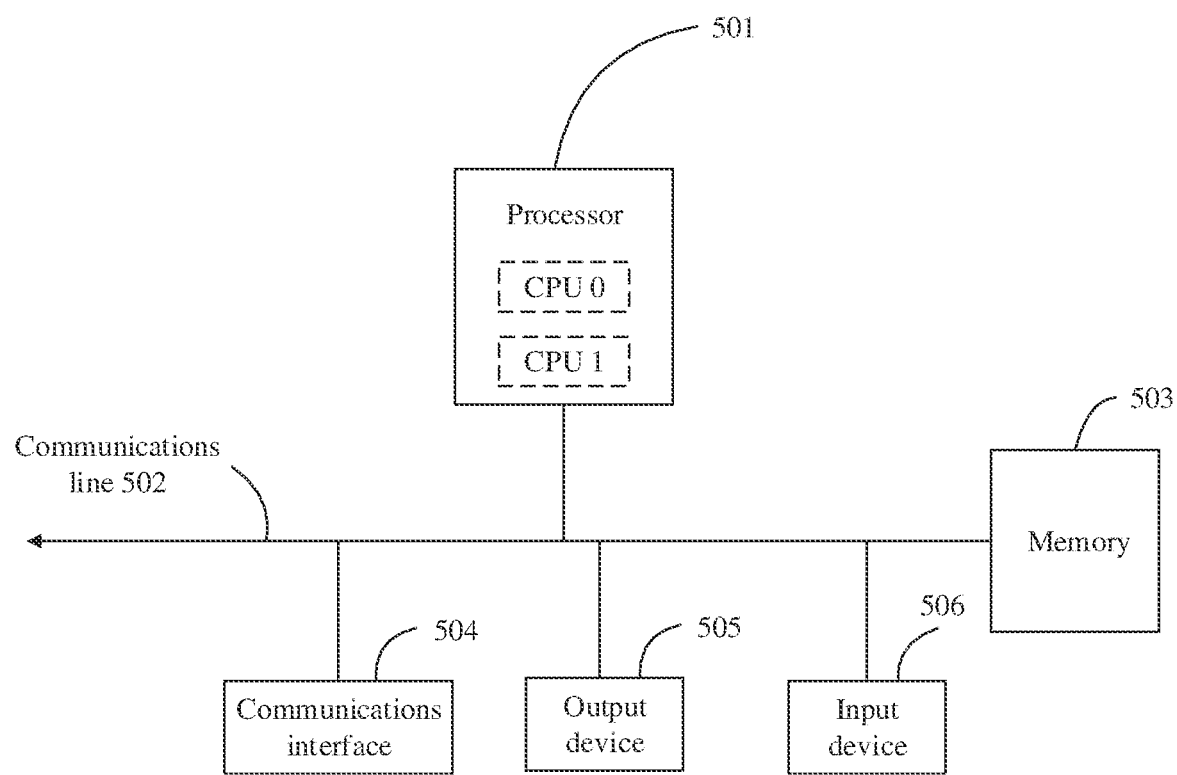
FIG. 5 is a schematic diagram of an apparatus of a network device and a terminal device according to an embodiment of this application.

For example, the foregoing information transmission method may be implemented by using the electronic device in FIG. 5. FIG. 5 is a schematic diagram of a hardware structure of an electronic device according to an embodiment of this application. The electronic device may be the network device in the embodiments of the present invention, or may be the terminal device. The electronic device includes at least one processor 501, a communications line 502, a memory 503, and at least one communications interface 504.

The processor 501 may be a general-purpose central processing unit (CPU), a microprocessor, an application-specific integrated circuit (ASIC, server IC), or one or more integrated circuits adapted to control program execution of the solution in this application.

The communications line 502 may include a path for transmitting information between the foregoing components.

The communications interface 504 uses any transceiver-type apparatus, adapted to communicate with another device or a communications network such as the Ethernet, a radio access network (RAN), or a wireless local area network (WLAN).

The memory 503 may be a read-only memory (ROM) or another type of static storage device capable of storing static information and an instruction, or a random access memory (RAM) or another type of dynamic storage device capable of storing information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. However, this is not limited thereto. The memory may exist independently, and is connected to the processor by using the communication line 502. Alternatively, the memory may be integrated with the processor.

The memory 503 is adapted to store computer-executable instructions for executing the solutions in this application. The processor 501 is adapted to execute the computer-executable instructions stored in the memory 503, to implement the method provided in the following embodiments of this application.

Optionally, the computer-executable instructions in this embodiment of this application may also be referred to as application program code. This is not specifically limited in this embodiment of this application.

In specific implementation, in an embodiment, the processor 501 may include one or more CPUs, such as a CPU 0 and a CPU 1 in FIG. 5.

In specific implementation, in an embodiment, the electronic device may include a plurality of processors, such as the processor 501 in FIG. 5. Each of the processors may be a single-core (single-CPU) processor, or may be a multi-core (multi-CPU) processor. The processor herein may refer to one or more devices, circuits, and/or processing cores adapted to process data (for example, computer program instructions).

In specific implementation, in an embodiment, the electronic device may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, a projector, or the like. The input device 506 communicates with the processor 501, and may receive an input from a user in a plurality of manners. For example, the input device 506 may be a mouse, a keyboard, a touchscreen device, a sensor device, or the like.

The electronic device may be a general-purpose device or a dedicated device. In specific implementation, the electronic device may be a server, a wireless terminal device, an embedded device, or a device having a structure similar to that in FIG. 5. A type of the electronic device is not limited in this embodiment of this application.

In the embodiments of this application, the electronic device may be divided into functional units based on the foregoing method example. For example, each function unit may be obtained through division based on each corresponding function, or two or more functions may be integrated into one processing unit. The integrated unit may be implemented in a form of hardware, or may be implemented in a form of a software functional unit. It should be noted that, in this embodiment of this application, unit division is an example, and is merely a logical function division. In actual implementation, another division manner may be used.

Figure 6:
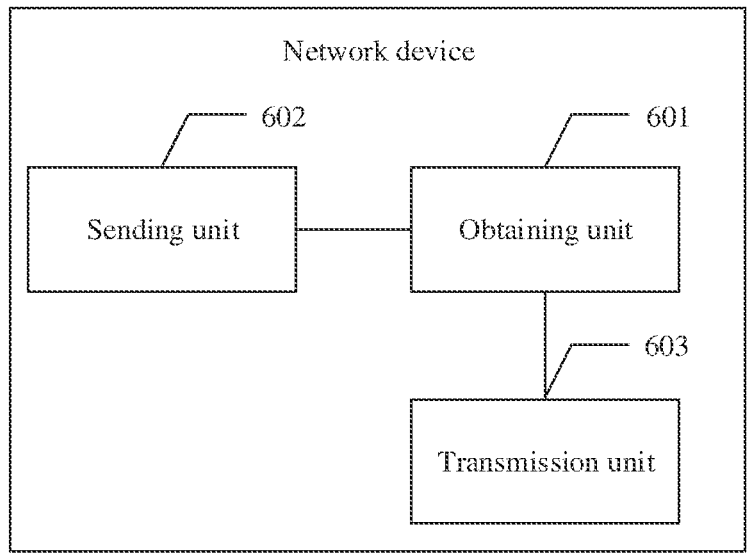
FIG. 6 is a schematic structural diagram of a network device according to an embodiment of this application.
Figure 7:
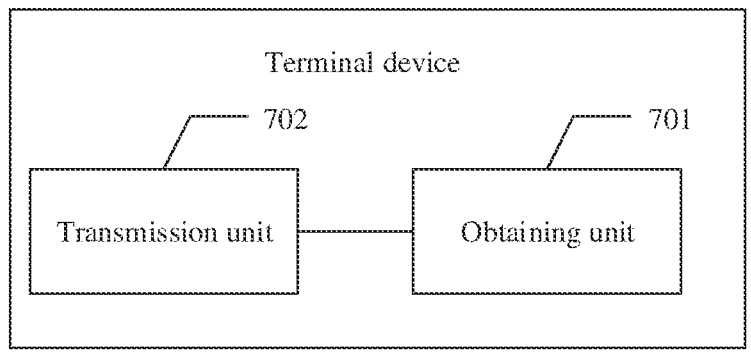
FIG. 7 is a schematic structural diagram of a terminal device according to an embodiment of this application.

For example, when the functional units are obtained through division in an integrated manner, FIG. 6 is a schematic structural diagram of a network device, and FIG. 7 is a schematic structural diagram of a terminal device.

As shown in FIG. 6, the network device provided in this embodiment of this application includes an obtaining unit 601, where the obtaining unit 601 is adapted to configure first beam sequence information, where the first beam sequence information is used to indicate a plurality of pieces of first identification information, and each of the plurality of pieces of first identification information is used to indicate one beam that carries a transmission signal, a sending unit 602, where the sending unit 602 is adapted to send the first beam sequence information obtained by the obtaining unit 601 to a terminal device, and a transmission unit 603, where the transmission unit 603 is adapted to perform signal transmission with the terminal device, where the beams corresponding to the plurality of pieces of first identification information in the first beam sequence information configured by the obtaining unit 601 are used for the signal transmission.

Further, the obtaining unit 601 is further adapted to configure time sequence indication information, where the time sequence indication information is used to indicate a moment at which the network device and the terminal device perform the signal transmission by using the beams indicated by using the plurality of pieces of first identification information, and correspondingly, the sending unit 602 is further adapted to send the time sequence indication information obtained by the obtaining unit 601 to the terminal device.

Further, the obtaining unit 601 is further adapted to configure periodicity information, where the periodicity information is used to indicate a periodicity in which the network device and the terminal device perform the signal transmission by using the beams indicated by using the plurality of pieces of first identification information, correspondingly, the sending unit 602 is further adapted to send the periodicity information configured by the obtaining unit 601 to the terminal device, and correspondingly, the transmission unit 603 is further adapted to perform the signal transmission with the terminal device based on the first beam sequence information in the periodicity indicated by using the periodicity information sent by the sending unit 602.

Further, the obtaining unit 601 is further adapted to obtain second beam sequence information, where the second beam sequence information includes a plurality of pieces of second identification information, and the second identification information and the first identification information are different, correspondingly, the sending unit 602 is further adapted to send the second beam sequence information configured by the obtaining unit 601 to the terminal device, and correspondingly, the transmission unit 603 is further adapted to perform, in the periodicity indicated by using the periodicity information sent by the sending unit 602, signal transmission with the terminal device based on the first beam sequence information sent by the sending unit 602 and the second beam sequence information sent by the sending unit 602.

Further, the obtaining unit 601 is further adapted to obtain a plurality of pieces of first beam sequence information, where the plurality of pieces of first beam sequence information are different, correspondingly, the sending unit 602 is further adapted to send beam indication information to the terminal device, where the beam indication information is used to indicate target beam sequence information, and the target beam sequence information is one of the plurality of pieces of first beam sequence information configured by the obtaining unit 601, and correspondingly, the transmission unit 603 is further adapted to perform, in the periodicity indicated by using the periodicity information, the signal transmission with the terminal device based on the target beam sequence information indicated by using the beam indication information sent by the sending unit 602.

Further, the obtaining unit 601 is further adapted to configure a signal type of the signal transmission, where the first beam sequence information corresponds to the signal type of the signal transmission.

Further, the signal type of the signal transmission is physical downlink control signal, and the obtaining unit 601 is further adapted to configure resource information of the physical downlink control signal, where the resource information includes a plurality of pieces of time domain or frequency domain location information, and each of the plurality of pieces of time domain or frequency domain location information is associated with at least one piece of first identification information, correspondingly, the sending unit 602 is further adapted to send the plurality of pieces of time domain or frequency domain location information obtained by the obtaining unit 601 to the terminal device, and correspondingly, the transmission unit 603 is further adapted to send, by using beams indicated by using the associated first identification information, the physical downlink control signal to the terminal device in the one or more pieces of time domain and/or frequency domain location information that is configured by the obtaining unit 601.

Further, a plurality of time domain or frequency domain locations are located in a search space of the physical downlink control signal.

The obtaining unit may be a processor. The sending unit and the transmission unit may be combined into one transceiver unit or communications unit. The transceiver unit may be a transceiver, or a transmitter and a receiver.

As shown in FIG. 7, the terminal device provided in this embodiment of this application includes an obtaining unit 701, where the obtaining unit 701 is adapted to obtain first beam sequence information sent by the network device, where the first beam sequence information is used to indicate a plurality of pieces of first identification information, and each of the plurality of pieces of first identification information is used to indicate one beam that carries a transmission signal, and a transmission unit 702, where the transmission unit 702 is further adapted to perform signal transmission with the network device, where the beams indicated by using the plurality of pieces of first identification information in the first beam sequence information obtained by the obtaining unit 701 are used for the signal transmission.

Further, the obtaining unit 701 is further adapted to obtain time sequence indication information sent by the network device, where the time sequence indication information is used to indicate a moment at which the network device and the terminal device perform the signal transmission by using the beams indicated by using the plurality of pieces of first identification information.

Further, the obtaining unit 701 is further adapted to obtain periodicity information sent by the network device, where the periodicity information is used to indicate a periodicity in which the network device and the terminal device perform the signal transmission by using the beams indicated by using the plurality of pieces of first identification information, and correspondingly, the transmission unit 702 is further adapted to perform the signal transmission with the network device based on the first beam sequence information in the periodicity indicated by using the periodicity information obtained by the obtaining unit 701.

Further, the obtaining unit 701 is further adapted to obtain second beam sequence information sent by the network device, where the second beam sequence information includes a plurality of pieces of second identification information, and the second identification information and the first identification information are different, and correspondingly, the transmission unit 702 is further adapted to perform, in the periodicity indicated by using the periodicity information obtained by the obtaining unit 701, the signal transmission with the network device based on the first beam sequence information obtained by the obtaining unit 701 and the second beam sequence information obtained by the obtaining unit 701.

Further, the obtaining unit 701 is further adapted to obtain a plurality of pieces of first beam sequence information sent by the network device, where the plurality of pieces of first beam sequence information are different, and obtain beam indication information sent by the network device, where the beam indication information is used to indicate target beam sequence information, and the target beam sequence information is one of the plurality of pieces of first beam sequence information, and correspondingly, the transmission unit 702 is further adapted to perform, in the periodicity indicated by using the periodicity information, the signal transmission with the network device based on the target beam sequence information obtained by the obtaining unit 701.

Further, the first beam sequence information corresponds to the signal type of the signal transmission.

Further, the signal type of the signal transmission is physical downlink control signal, and the obtaining unit 701 is further adapted to obtain a plurality of pieces of time domain or frequency domain location information sent by the network device, where each of the plurality of pieces of time domain or frequency domain location information is associated with at least one piece of first identification information, and correspondingly, the transmission unit 702 is further adapted to receive, by using beams indicated by using the associated first identification information, the physical downlink control signal sent by the network device in the one or more pieces of time domain and/or frequency domain location information that is configured by the obtaining unit 701.

Further, a plurality of time domain or frequency domain locations are located in a search space of the physical downlink control signal.

The obtaining unit may be a processor. The transmission unit may be a transceiver unit or a communications unit. The transceiver unit may be a transceiver, or a transmitter and a receiver.

This application further provides a network device. The network device includes a transceiver, a processor, and a memory. The processor is adapted to control the transceiver to send and receive a signal, the memory is adapted to store a computer program, and the processor is adapted to invoke and run the computer program stored in the memory, so that the network device performs the information transmission method according to any one of the foregoing embodiments.

This application further provides a chip system. The chip system includes a processor. The processor is adapted to read and execute a computer program stored in a memory, to perform the method in any one of the foregoing embodiments. Optionally, the chip further includes the memory, and the memory and the processor are connected to another memory through a circuit or a wire. Further, optionally, the chip further includes a communications interface. The processor is connected to the communications interface. The communications interface is adapted to receive data and/or information that needs to be processed. The processor obtains the data and/or the information from the communications interface, processes the data and/or the information, and outputs a processing result by using the communications interface. The communications interface may be an input/output interface. Optionally, the memory and the processor may be physically independent units, or the memory and the processor may be integrated together.

This application further provides a computer program product. The computer program product includes computer program code. When the computer program code is run on a computer, the computer is enabled to perform the information transmission method in any one of the foregoing embodiments.

This application further provides a communications apparatus. The communications apparatus has a function of implementing the network device in the information transmission method in any one of the foregoing embodiments. The functions may be implemented by hardware, or may be implemented by hardware executing corresponding software. The hardware or the software includes one or more units corresponding to the functions.

This application further provides a terminal device. The terminal device includes a transceiver, a processor, and a memory. The processor is adapted to control the transceiver to send and receive a signal, the memory is adapted to store a computer program, and the processor is adapted to invoke and run the computer program stored in the memory, so that the terminal device performs the information transmission method in to any one of the foregoing embodiments.

This application further provides a chip. The chip includes a processor. The processor is adapted to read and execute a computer program stored in a memory, to perform the method in any one of the foregoing embodiments. Optionally, the chip further includes the memory, and the memory and the processor are connected to another memory through a circuit or a wire. Further, optionally, the chip further includes a communications interface. The processor is connected to the communications interface. The communications interface is adapted to receive data and/or information that needs to be processed. The processor obtains the data and/or the information from the communications interface, processes the data and/or the information, and outputs a processing result by using the communications interface. The communications interface may be an input/output interface. Optionally, the memory and the processor may be physically independent units, or the memory and the processor may be integrated together.

This application further provides a computer program product. The computer program product includes computer program code. When the computer program code is run on a computer, the computer is enabled to perform the information transmission method in any one of the foregoing embodiments.

This application further provides a communications apparatus. The communications apparatus has a function of implementing the terminal device in the information transmission method in any one of the foregoing embodiments. The functions may be implemented by hardware, or may be implemented by hardware executing corresponding software. The hardware or the software includes one or more units corresponding to the functions.

This application further provides an information transmission system. The system includes a network device and a terminal device. The network device is adapted to perform the information transmission method according to any one of the foregoing embodiments. The terminal device is adapted to perform the information transmission method according to any one of the foregoing embodiments.

This application further provides an information transmission system. The system includes the network device in any of the embodiments mentioned above or a network device including the chip in any of the embodiments mentioned above, and the terminal device in any of the embodiments mentioned above, or a terminal device including the chip in any of the embodiments mentioned above.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the current technology may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions in the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the steps of the methods in the foregoing embodiments may be implemented by a program instructing related hardware. The program may be stored in a computer-readable storage medium. The storage medium may include a ROM, a RAM, a magnetic disk, an optical disc, or the like.

The information transmission method, the network device, the terminal device, and the storage medium provided in the embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. An information transmission method, comprising:
configuring, by a network device, first beam sequence information and second beam sequence information, wherein the first beam sequence information indicates a plurality of pieces of first identification information, wherein the second beam sequence information indicates a plurality of pieces of second identification information, wherein the second identification information and the first identification information are different, and wherein each of the plurality of pieces of first identification information indicates one beam that carries a transmission signal;
sending, by the network device, the first beam sequence information and the second beam sequence information to a terminal device; and
performing, by the network device, signal transmission with the terminal device using the beams indicated by the plurality of pieces of first identification information and the plurality of pieces of second identification information based on the communication quality between the network device and the terminal device.

2. The method according to claim 1, further comprising:
configuring, by the network device, time sequence indication information, wherein the time sequence indication information is used to indicate a moment at which the network device and the terminal device perform the signal transmission by using the beams indicated by using the plurality of pieces of first identification information; and
sending, by the network device, the time sequence indication information to the terminal device.

3. The method according to claim 1, further comprising:
configuring, by the network device, periodicity information, wherein the periodicity information indicates a periodicity in which the network device and the terminal device perform the signal transmission using the beams indicated by the plurality of pieces of first identification information; and
sending, by the network device, the periodicity information to the terminal device;
wherein the performing, by the network device, the signal transmission with the terminal device comprises:
performing, by the network device, the signal transmission with the terminal device based on the first beam sequence information in the periodicity indicated by the periodicity information.

4. The method according to claim 3, wherein the performing, by the network device, the signal transmission with the terminal device comprises:
performing, by the network device, the signal transmission with the terminal device based on the first beam sequence information and the second beam sequence information and further in the periodicity indicated by the periodicity information.

5. The method according to claim 3, wherein the configuring the first beam sequence information comprises:
configuring, by the network device, a plurality of pieces of first beam sequence information, wherein each piece of first beam sequence information of the plurality of pieces of first beam sequence information is different from each other piece of first beam sequence information;
wherein the method further comprises:
sending, by the network device, beam indication information to the terminal device, wherein the beam indication information indicates target beam sequence information, and wherein the target beam sequence information is one of the plurality of pieces of first beam sequence information; and
wherein the performing the signal transmission with the terminal device comprises:

performing, by the network device, the signal transmission with the terminal device based on the target beam sequence information and in the periodicity indicated by the periodicity information.

6. The method according to claim 1, further comprising:
configuring, by the network device, a signal type of the signal transmission, wherein the first beam sequence information corresponds to the signal type.

7. The method according to claim 1, wherein a signal type of the signal transmission is physical downlink control signal, and wherein the method further comprises:
configuring, by the network device, resource information of the physical downlink control signal, wherein the resource information comprises a plurality of pieces of at least one of time domain information or frequency domain location information, and each of the plurality of the at least one of the time domain information or the frequency domain location information is associated with at least one piece of first identification information; and
sending, by the network device, the plurality of pieces of the at least one of the time domain information or the frequency domain location information to the terminal device; and
wherein the performing the signal transmission with the terminal device comprises:
sending, by the network device, the physical downlink control signal to the terminal device according to the plurality of the pieces the at least one of the time domain information or the frequency domain location information using beams indicated by the associated first identification information.

8. A network device, comprising:
a transceiver;
a processor; and
a non-transitory computer readable medium connected to the processor and storing a program for execution by the processor, the program including instructions to:
configure first beam sequence information and second beam sequence information, wherein the first beam sequence information indicates a plurality of pieces of first identification information, wherein the second beam sequence information indicates a plurality of pieces of second identification information, wherein the second identification information and the first identification information are different, and wherein each of the plurality of pieces of first identification information indicates one beam that carries a transmission signal;
cause the transceiver to send the first beam sequence information and the second beam sequence information obtained by the processor to a terminal device; and
perform signal transmission with the terminal device using the beams indicated by the plurality of pieces of first identification information and the plurality of pieces of second identification information.

9. The network device according to claim 8, wherein the program further includes instructions to:
configure time sequence indication information, wherein the time sequence indication information indicates a moment at which the network device and the terminal device perform the signal transmission using the beams indicated by the plurality of pieces of first identification information; and
cause the transceiver to send the time sequence indication information to the terminal device.

10. The network device according to claim 8, wherein the program further includes instructions to:
configure periodicity information, wherein the periodicity information indicates a periodicity in which the network device and the terminal device perform the signal transmission using the beams indicated by the plurality of pieces of first identification information; and
cause the transceiver to send the periodicity information to the terminal device; and
wherein the instructions to perform signal transmission with the terminal device include instructions to perform the signal transmission with the terminal device based on the first beam sequence information in the periodicity indicated by the periodicity information.

11. The network device according to claim 10, wherein the instructions to perform signal transmission with the terminal device include instructions to perform, in the periodicity indicated by the periodicity information, the signal transmission with the terminal device based on the first beam sequence information and the second beam sequence information.

12. The network device according to claim 10, wherein the program further includes instructions to:
obtain a plurality of pieces of first beam sequence information, wherein each piece of first beam sequence information of the plurality of pieces of first beam sequence information is different from each other piece of first beam sequence information; and
cause the transceiver to send beam indication information to the terminal device, wherein the beam indication information indicates target beam sequence information, and wherein the target beam sequence information is one of the plurality of pieces of first beam sequence information; and
wherein the instructions to perform signal transmission with the terminal device include instructions to perform, in the periodicity indicated by the periodicity information, the signal transmission with the terminal device based on the target beam sequence information indicated by the beam indication information.

13. The network device according to claim 8, wherein the program further includes instructions to:
configure a signal type of the signal transmission, wherein the first beam sequence information corresponds to the signal type of the signal transmission.

14. The network device according to claim 8, wherein a signal type of the signal transmission is physical downlink control signal; and
wherein the program further includes instructions to:
configure resource information of the physical downlink control signal, wherein the resource information comprises a plurality of pieces of at least one of time domain information or frequency domain location information, and wherein each piece of the plurality of the pieces of at least one of the time domain information or the frequency domain location information is associated with at least one piece of first identification information;
cause the transceiver to send the plurality of the pieces of at least one of the time domain information to the terminal device; and
send, using beams indicated by the associated first identification information, the physical downlink control signal to the terminal device in the plurality of the pieces of at least one of the time domain information or the frequency domain location information.

15. A terminal device, comprising:
a transceiver;
an processor; and
a non-transitory computer readable medium connected to the processor and storing a program for execution by the processor, the program including instructions to:
  obtain first beam sequence information and second beam sequence information sent by a network device, wherein the first beam sequence information indicates a plurality of pieces of first identification information, wherein the second beam sequence information indicates a plurality of pieces of second identification information, wherein the second identification information and the first identification information are different, and wherein each of the plurality of pieces of first identification information indicates one beam that carries a transmission signal; and
  cause the transceiver to perform signal transmission with the network device using the beams indicated by the plurality of pieces of first identification information and the plurality of pieces of second beam sequence information.

16. The terminal device according to claim 15, wherein the program further includes instructions to:
  obtain time sequence indication information sent by the network device, wherein the time sequence indication information indicates a moment at which the network device and the terminal device perform the signal transmission using the beams indicated by the plurality of pieces of first identification information.

17. The terminal device according to claim 15, wherein the program further includes instructions to:
  obtain periodicity information sent by the network device, wherein the periodicity information indicates a periodicity in which the network device and the terminal device perform the signal transmission using the beams indicated by the plurality of pieces of first identification information; and
  wherein the instructions to cause the transceiver to perform signal transmission with the network device include instructions to cause the transceiver to perform the signal transmission with the network device based on the first beam sequence information in the periodicity indicated by the periodicity information.

18. The terminal device according to claim 17, wherein the instructions to cause the transceiver to perform signal transmission with the network device include instructions to perform, in the periodicity indicated by the periodicity information, the signal transmission with the network device based on the first beam sequence information and the second beam sequence information.

19. The terminal device according to claim 17, wherein the program further includes instructions to:
  obtain a plurality of pieces of first beam sequence information sent by the network device, wherein each piece of first beam sequence information of the plurality of pieces of first beam sequence information is different from each other piece of first beam sequence information; and
  obtain beam indication information sent by the network device, wherein the beam indication information indicates target beam sequence information, and wherein the target beam sequence information is one of the plurality of pieces of first beam sequence information; and
  wherein the instructions to cause the transceiver to perform signal transmission with the network device include instructions to perform, in the periodicity indicated by the periodicity information, the signal transmission with the network device based on the target beam sequence information.

20. The terminal device according to claim 15, wherein a signal type of the signal transmission is physical downlink control signal; and
  wherein the program further includes instructions to:
    obtain a plurality of pieces of at least one of time domain information or frequency domain location information sent by the network device, wherein each of the plurality of pieces of the at least one of the time domain information or the frequency domain location information is associated with at least one piece of first identification information; and
    cause the transceiver to receive, using beams indicated by the associated first identification information, the physical downlink control signal sent by the network device in the plurality of pieces of the at least one of the time domain information or the frequency domain location information.

* * * * *